US010239566B2

(12) United States Patent
Bauer et al.

(10) Patent No.: US 10,239,566 B2
(45) Date of Patent: Mar. 26, 2019

(54) COMPOSITE FLOOR FOR A DRY TRUCK BODY

(71) Applicant: Wabash National, L.P., Lafayette, IN (US)

(72) Inventors: Jeffrie Scott Bauer, Oxford, IN (US); Michael L. Thoma, Lafayette, IN (US); Scott A. Storz, Lafayette, IN (US)

(73) Assignee: Wabash National, L.P., Lafayette, IN (US)

( * ) Notice: Subject to any disclaimer, the term of this patent is extended or adjusted under 35 U.S.C. 154(b) by 0 days.

(21) Appl. No.: 15/437,290

(22) Filed: Feb. 20, 2017

(65) Prior Publication Data

US 2017/0240216 A1    Aug. 24, 2017

Related U.S. Application Data

(60) Provisional application No. 62/299,308, filed on Feb. 24, 2016.

(51) Int. Cl.
| | |
|---|---|
| *B62D 33/00* | (2006.01) |
| *B62D 25/20* | (2006.01) |
| *B62D 33/04* | (2006.01) |
| *B62D 29/00* | (2006.01) |
| *B62D 29/04* | (2006.01) |

(52) U.S. Cl.
CPC ....... *B62D 33/046* (2013.01); *B62D 25/2054* (2013.01); *B62D 29/005* (2013.01); *B62D 29/043* (2013.01)

(58) Field of Classification Search
CPC .. B62D 33/044; B62D 33/046; B62D 33/048; B62D 33/023; B62D 29/005

USPC ......... 296/181.6, 182.1, 184.1, 185.1, 186.1, 296/186.3
See application file for complete search history.

(56) References Cited

U.S. PATENT DOCUMENTS

| | | |
|---|---|---|
| 3,557,992 A | 1/1971 | Reeves |
| 3,637,252 A | 1/1972 | Metsker |
| 4,418,507 A | 12/1983 | Roberts et al. |
| 4,685,720 A | 8/1987 | Oren |
| 4,758,299 A | 7/1988 | Burke |
| 4,976,490 A | 12/1990 | Gentle |
| 5,403,063 A | 4/1995 | Sjostedt et al. |

(Continued)

FOREIGN PATENT DOCUMENTS

| | | |
|---|---|---|
| AU | 713260 | 11/1999 |
| CA | 1329818 | 5/1994 |

(Continued)

OTHER PUBLICATIONS

Black, Sara, "Structural adhesives, Part I: Industrial," CompositesWorld, posted Apr. 11, 2016, 7 pages.

(Continued)

*Primary Examiner* — Dennis H Pedder
(74) *Attorney, Agent, or Firm* — Faegre Baker Daniels LLP

(57) ABSTRACT

A vehicle is disclosed having a composite cargo body. A floor of the cargo body is constructed of a first composite material. A roof, a right sidewall, a left sidewall, and a nose of the cargo body are constructed of a second composite material different from the first composite material. Various components of the composite cargo body are bonded together with an adhesive. Mechanical fasteners also may be used to join other components of composite cargo body.

21 Claims, 6 Drawing Sheets

(56) References Cited

U.S. PATENT DOCUMENTS

| | | | |
|---|---|---|---|
| 5,429,066 A | 7/1995 | Lewit et al. | |
| 5,507,405 A | 4/1996 | Thomas | |
| 5,509,714 A * | 4/1996 | Schmidt | B62D 33/046 |
| | | | 105/401 |
| 5,562,981 A | 10/1996 | Ehrlich | |
| 5,588,693 A * | 12/1996 | Higginson | B62D 33/046 |
| | | | 296/186.1 |
| 5,664,518 A | 9/1997 | Lewit et al. | |
| 5,700,118 A | 12/1997 | Bennett | |
| 5,765,639 A | 6/1998 | Muth | |
| 5,772,276 A | 6/1998 | Fetz et al. | |
| 5,800,749 A | 9/1998 | Lewit et al. | |
| 5,802,984 A | 9/1998 | Thoman | |
| 5,830,308 A | 11/1998 | Reichard | |
| 5,860,668 A | 1/1999 | Hull et al. | |
| 5,860,693 A | 1/1999 | Ehrlich | |
| 5,890,435 A | 4/1999 | Thoman | |
| 5,897,818 A | 4/1999 | Lewit et al. | |
| 5,908,591 A | 6/1999 | Lewit et al. | |
| 5,916,093 A | 6/1999 | Fecko | |
| 5,979,684 A | 11/1999 | Ohnishi | |
| 5,992,117 A | 11/1999 | Schmidt | |
| 6,004,492 A | 12/1999 | Lewit et al. | |
| 6,013,213 A | 1/2000 | Lewit et al. | |
| 6,076,693 A | 6/2000 | Reiter | |
| 6,082,810 A | 7/2000 | Bennett | |
| 6,092,472 A | 7/2000 | Thoman | |
| 6,199,939 B1 | 3/2001 | Ehrlich | |
| 6,206,669 B1 | 3/2001 | Lewit et al. | |
| 6,220,651 B1 | 4/2001 | Ehrlich | |
| 6,227,125 B1 | 5/2001 | Schroeder | |
| 6,247,747 B1 | 6/2001 | Kawanomoto | |
| 6,318,794 B1 | 11/2001 | Berube | |
| 6,349,988 B1 | 2/2002 | Foster | |
| 6,374,546 B1 | 4/2002 | Fecko | |
| 6,496,190 B1 | 12/2002 | Driemeyer et al. | |
| 6,497,190 B1 | 12/2002 | Lewit | |
| 6,505,883 B1 | 1/2003 | Ehrlich | |
| 6,543,469 B2 | 4/2003 | Lewit et al. | |
| 6,615,741 B2 | 9/2003 | Fecko | |
| 6,626,622 B2 | 9/2003 | Zubko | |
| 6,688,835 B1 | 2/2004 | Buher | |
| 6,723,273 B2 | 4/2004 | Johnson et al. | |
| 6,740,381 B2 | 5/2004 | Day et al. | |
| 6,745,470 B2 | 6/2004 | Foster et al. | |
| 6,755,998 B1 | 6/2004 | Reichard et al. | |
| 6,761,840 B2 | 7/2004 | Fecko | |
| 6,824,341 B2 | 11/2004 | Ehrlich | |
| 6,843,525 B2 | 1/2005 | Preisler | |
| 6,854,791 B1 | 2/2005 | Jaggi | |
| 6,863,339 B2 | 3/2005 | Bohm | |
| 6,869,561 B2 | 3/2005 | Johnson et al. | |
| 6,877,940 B2 | 4/2005 | Nelson | |
| 6,893,075 B2 | 5/2005 | Fenton et al. | |
| 6,911,252 B2 | 6/2005 | Lewit et al. | |
| 6,986,546 B2 | 1/2006 | Ehrlich | |
| 7,000,978 B1 | 2/2006 | Messano | |
| 7,025,166 B2 | 4/2006 | Thomas | |
| 7,025,408 B2 | 4/2006 | Jones et al. | |
| 7,069,702 B2 | 7/2006 | Ehrlich | |
| 7,114,762 B2 | 10/2006 | Smidler | |
| 7,134,820 B2 | 11/2006 | Ehrlich | |
| 7,182,396 B2 | 2/2007 | Taylor | |
| 7,219,952 B2 | 5/2007 | Taylor | |
| 7,264,305 B2 | 9/2007 | Kuriakose | |
| 7,353,960 B2 | 4/2008 | Seiter | |
| 7,407,216 B2 | 8/2008 | Taylor | |
| 7,434,520 B2 | 10/2008 | Zupancich | |
| 7,451,995 B2 | 11/2008 | Bloodworth et al. | |
| 7,461,888 B2 | 12/2008 | Brown | |
| 7,517,005 B2 | 4/2009 | Kuriakose | |
| 7,575,264 B1 | 8/2009 | Solomon | |
| 7,578,534 B2 | 8/2009 | Weariful, III | |
| 7,578,541 B2 | 8/2009 | Layfield | |
| 7,587,984 B2 | 9/2009 | Zupancich | |
| 7,588,286 B2 | 9/2009 | Lewallen | |
| 7,594,474 B2 | 9/2009 | Zupancich | |
| 7,608,313 B2 | 10/2009 | Solomon | |
| 7,621,589 B1 | 11/2009 | Gerome | |
| 7,704,026 B2 | 4/2010 | Roush | |
| 7,722,112 B2 | 5/2010 | Ehrlich | |
| 7,748,172 B2 | 7/2010 | Zupancich | |
| 7,762,618 B2 | 7/2010 | Lewallen | |
| 7,790,076 B2 | 9/2010 | Seiter | |
| 7,829,165 B2 | 11/2010 | Grandominico et al. | |
| 7,887,120 B2 | 2/2011 | Bovine | |
| 7,901,537 B2 | 3/2011 | Jones | |
| 7,905,072 B2 | 3/2011 | Verhaeghe | |
| 7,914,034 B2 | 3/2011 | Roush | |
| 7,931,328 B2 | 4/2011 | Lewallen | |
| 8,016,322 B2 | 9/2011 | Keehan | |
| 8,056,960 B2 | 11/2011 | Brown | |
| 8,186,747 B2 | 5/2012 | Bloodworth et al. | |
| 8,263,217 B2 | 9/2012 | Verhaeghe | |
| 8,342,588 B2 | 1/2013 | Skaradzinski | |
| 8,448,989 B2 | 5/2013 | Verhaeghe | |
| 8,474,871 B1 | 7/2013 | Ludwick | |
| 8,696,048 B2 * | 4/2014 | Griffin | B62D 25/2054 |
| | | | 296/184.1 |
| 8,757,704 B2 | 6/2014 | Zhao et al. | |
| 8,814,255 B2 | 8/2014 | Yamaji et al. | |
| 8,876,193 B2 | 11/2014 | Kunkel et al. | |
| 8,950,144 B2 | 2/2015 | Padmanabhan | |
| 9,051,014 B2 | 6/2015 | Lookebill et al. | |
| 9,138,943 B2 | 9/2015 | Weinberg | |
| 9,138,974 B2 | 9/2015 | Weinberg | |
| 9,138,975 B2 | 9/2015 | Weinberg | |
| 9,174,656 B2 | 11/2015 | Heitmeyer | |
| 9,199,440 B2 | 12/2015 | Weinberg | |
| 9,205,635 B2 | 12/2015 | Weinberg | |
| 9,260,117 B2 | 2/2016 | Vande Sands | |
| 9,317,468 B2 | 4/2016 | Liebald et al. | |
| 9,339,987 B2 | 5/2016 | Weinberg | |
| 9,409,607 B2 | 8/2016 | Osten | |
| 9,434,421 B1 | 9/2016 | Lu | |
| 9,499,203 B1 | 11/2016 | Finley | |
| 9,566,769 B2 | 2/2017 | Weinberg | |
| 9,604,677 B2 | 3/2017 | McKinney | |
| 9,650,003 B2 | 5/2017 | Owens | |
| 9,708,009 B2 | 7/2017 | Vance | |
| 9,738,050 B2 | 8/2017 | Lee | |
| 9,744,753 B2 | 8/2017 | Sheffield | |
| 9,815,501 B2 | 11/2017 | McCormack | |
| 9,827,750 B2 | 11/2017 | Lookebill | |
| 9,828,164 B2 | 11/2017 | Denson | |
| 9,878,744 B2 | 1/2018 | Lu | |
| 9,884,660 B2 | 2/2018 | Fenton | |
| 9,884,661 B2 | 2/2018 | Fenton | |
| 9,889,637 B2 | 2/2018 | Weinberg | |
| 2001/0011832 A1 | 8/2001 | Ehrlich | |
| 2005/0194381 A1 | 9/2005 | Zupancich | |
| 2005/0241253 A1 | 11/2005 | Song et al. | |
| 2006/0065152 A1 | 3/2006 | Heitmeyer | |
| 2006/0108361 A1 | 5/2006 | Seiter | |
| 2006/0121244 A1 | 6/2006 | Godwin | |
| 2006/0123725 A1 | 6/2006 | Godwin | |
| 2006/0158005 A1 | 7/2006 | Brown | |
| 2006/0179733 A1 | 8/2006 | Padmanabhan | |
| 2006/0201081 A1 | 9/2006 | Godwin | |
| 2006/0219129 A1 | 10/2006 | Jarvis | |
| 2007/0102961 A1 * | 5/2007 | Lemmons | B62D 33/023 |
| | | | 296/186.1 |
| 2007/0119850 A1 | 5/2007 | Seiter | |
| 2007/0132278 A1 | 6/2007 | Lester et al. | |
| 2007/0160793 A1 | 7/2007 | Cageao | |
| 2007/0194602 A1 | 8/2007 | Ehrlich | |
| 2007/0216197 A1 | 9/2007 | Wuerfel, III | |
| 2007/0250025 A1 | 10/2007 | Sams | |
| 2008/0258500 A1 * | 10/2008 | Booher | B21C 23/145 |
| | | | 296/184.1 |
| 2008/0290057 A1 | 11/2008 | Zupancich | |
| 2009/0126600 A1 | 5/2009 | Zupancich | |
| 2009/0278386 A1 | 11/2009 | Ehrlich | |
| 2010/0101876 A1 | 4/2010 | Misencik | |

(56) References Cited

U.S. PATENT DOCUMENTS

| | | |
|---|---|---|
| 2010/0109309 A1 | 5/2010 | Kootstra |
| 2011/0095574 A1 | 4/2011 | Brown |
| 2011/0204611 A1 | 8/2011 | Ziegler |
| 2013/0207413 A1 | 8/2013 | Lookebill et al. |
| 2013/0207415 A1* | 8/2013 | Wylezinski .......... B62D 27/026 296/185.1 |
| 2014/0199551 A1 | 7/2014 | Lewit |
| 2014/0262011 A1 | 9/2014 | Lewit et al. |
| 2014/0300134 A1 | 10/2014 | Gerst |
| 2015/0054311 A1 | 2/2015 | Marchesano et al. |
| 2015/0076861 A1 | 3/2015 | Padmanabhan |
| 2015/0137560 A1 | 5/2015 | Presiler |
| 2015/0158532 A1 | 6/2015 | Ayuzawa |
| 2015/0203160 A1 | 7/2015 | Peterson et al. |
| 2017/0057561 A1 | 3/2017 | Fenton |
| 2017/0166263 A1 | 6/2017 | McKinney |
| 2017/0210317 A1 | 7/2017 | Owens |
| 2017/0240216 A1 | 8/2017 | Bauer |
| 2017/0240217 A1 | 8/2017 | Storz |
| 2017/0241134 A1 | 8/2017 | McCloud |
| 2017/0247063 A1 | 8/2017 | Banerjee |
| 2017/0282499 A1 | 10/2017 | LaRocco |
| 2017/0334489 A1 | 11/2017 | Shin |
| 2018/0037151 A1 | 2/2018 | Bauer et al. |

FOREIGN PATENT DOCUMENTS

| | | |
|---|---|---|
| CA | 2181750 | 1/1997 |
| CA | 2199584 | 9/1997 |
| CA | 2253308 | 11/1997 |
| CA | 2551863 | 3/1998 |
| CA | 2219312 | 4/1998 |
| CA | 2242467 | 7/1999 |
| CA | 2261384 | 8/1999 |
| CA | 2265405 | 1/2000 |
| CA | 2275848 | 12/2000 |
| CA | 2382578 | 3/2001 |
| CA | 2455957 | 5/2004 |
| CA | 2768878 | 3/2005 |
| CA | 2811134 | 4/2006 |
| CA | 2529762 | 6/2006 |
| CA | 2650992 | 11/2006 |
| CA | 2528558 | 5/2007 |
| CA | 2565510 | 8/2007 |
| CA | 2604282 | 3/2008 |
| CA | 2689745 | 7/2009 |
| CA | 2689746 | 7/2009 |
| CA | 2689747 | 7/2009 |
| CA | 2689748 | 7/2009 |
| CA | 2689749 | 7/2009 |
| CA | 2689751 | 7/2009 |
| CA | 2797778 | 7/2009 |
| CA | 2802907 | 7/2009 |
| CA | 2763094 | 9/2009 |
| CA | 2788047 | 8/2011 |
| CA | 2848174 | 10/2014 |
| CA | 2894059 | 12/2015 |
| CA | 2807710 | 5/2016 |
| CA | 2977131 | 9/2016 |
| CA | 2958805 | 8/2017 |
| CA | 2958838 | 8/2017 |
| CA | 2958839 | 8/2017 |
| DE | 2617169 | 10/2013 |
| EP | 2660119 | 6/2013 |
| JP | 06293233 | 10/1994 |

OTHER PUBLICATIONS

CMS North America, Inc., "Transportation: Refrigerated Semi-trailers, Trailers & Vans," available online at http://www.cmsna.com/13_transportation_refrigerated_semi_trailers_trailers_vans.php on or before Jul. 2, 2014, 2 pages.

North American Composites, Virtual Engineered Composites (VEC) Article, available online at http://www.nacomposites.com/delivering-performance/page.asp?issueid=7&page=cover, Fall 2006, 4 pages.

Reichard, Dr. Ronnal P., "Composites in Theme Parks: From the perspective of a contractor-trouble shooter-enthusiast!" presented at Florida Institute of Technology at least as early as 1999, 37 pages.

Lightweight Structures B.V., "ColdFeather: lightweight composite isothermal trailer," available online at http://www.lightweight-structures.com/coldfeather-lightweight-composite-isothermal-trailer/index.html at least as early as Jun. 18, 2015, 6 pages.

Expedition Portal, "Truck Camper Construction Costs?," available online at http://www.expeditionportal.com/forum/threads/12486-Truck-Camper-Construction-Costs at least as early as Jun. 18, 2015, 5 pages.

Griffiths, Bob, "Rudder Gets New Twist with Composites," CompositesWorld, posted Aug. 1, 2006, 4 pages.

Morey, Bruce, "Advanced Technologies Supplement: Processes Reduce Composite Costs," Advanced Manufacturing, posted Apr. 1, 2007, 7 pages.

NetCompositesNow.com, "Twisted Composites Rudders," available online at http://www.netcomposites.com/news/twisted-composites-rudders/3202 as early as Aug. 11, 2005, 3 pages.

Eric Green Associates.com, "Composite Rudders Take Shape for U.S. Navy" available online at http://www.ericgreeneassociates.com/images/Composite_Twisted_Rudder.pdf, accessed as early as Jul. 13, 2014, 7 pages.

Seaver, Mark and Trickey, Stephen, "Underwater Blast Loading of a Composite Twisted Rudder with FBGS," dated Apr. 14, 2008, 19th International Conference on Optical Fibre Sensors, 2 pages.

Scott Bader Group Companies, Crystic, "Composites Handbook", 100 pages.

Kedward, Keith and Whitney, James, Delaware Composites Design Encyclopedia, "Design Studies," vol. 5, 1990, preview version available at https://books.google.com/books?id=9-KYOm81MWEC&printsec=frontcover#v=onepage&q&f=false, 17 pages.

Zweben, Carl, Handbook of Materials Selection, "Chapter 12: Composite Materials," 2002, preview version available at https://books.google.com/books?id=gWg-rchM700C&printsec=frontcover#v=onepage&q&f=false, 47 pages.

Johnson Truck Bodies, Blizzard Series brochure, accessed as early as Aug. 1, 2014, 8 pages.

International Trucking Shows, "True Composites Platform Highlight of International Trucking Show," Aug. 1992, 1 page.

Composite Twisted Rudder, TCC Meeting 2008, handout, 32 pages.

Composite Marine Control Surface, installed on USS Pioneer (MCM 9), May 1997, 13 pages.

Trailer/Body Builders, "More Emphasis on Less Weight," available at http://trailer-bodybuilders.com/trailers/more-emphasis-less-weight, May 1, 2008, 5 pages.

Wabash National Commercial Trailer Products, DuraPlate® Dry Freight Truck Bodies, Oct. 2015, 2 pages.

\* cited by examiner

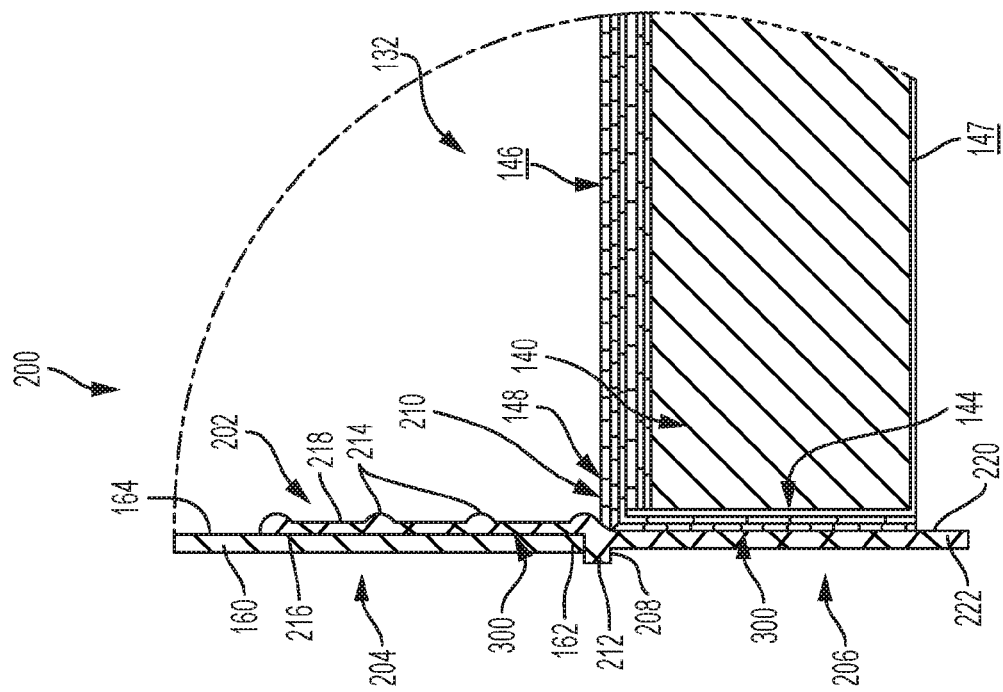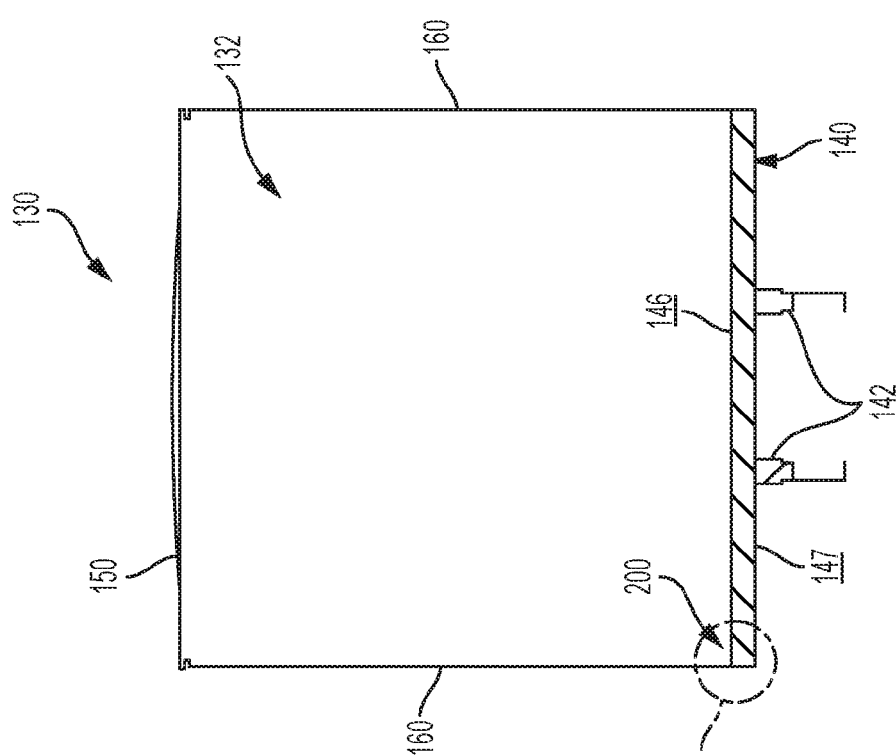

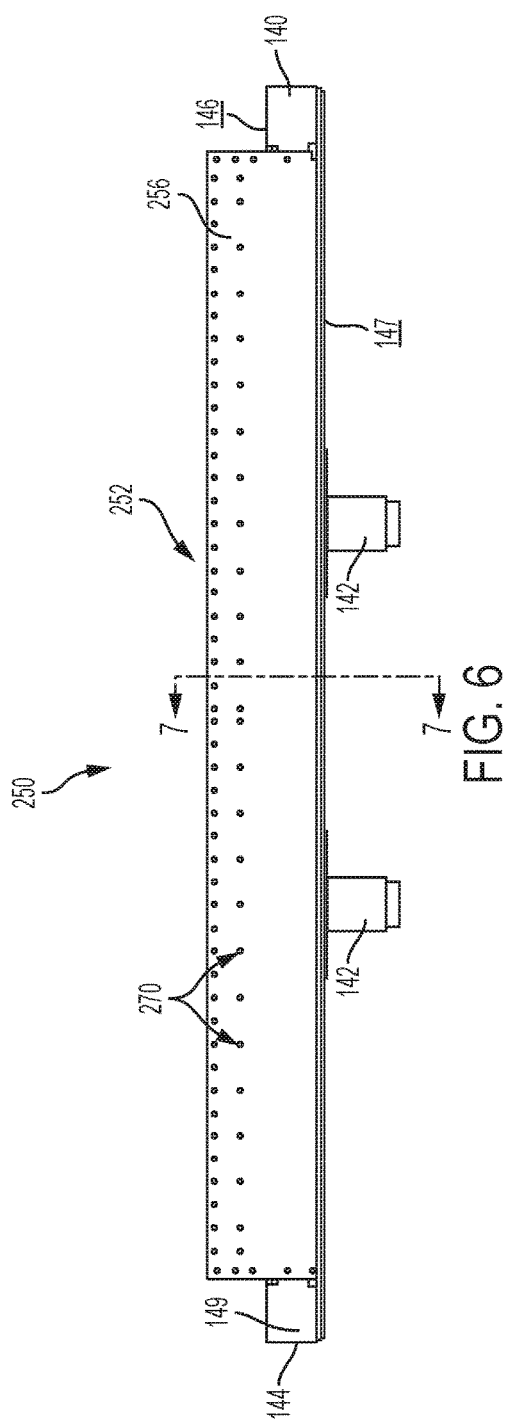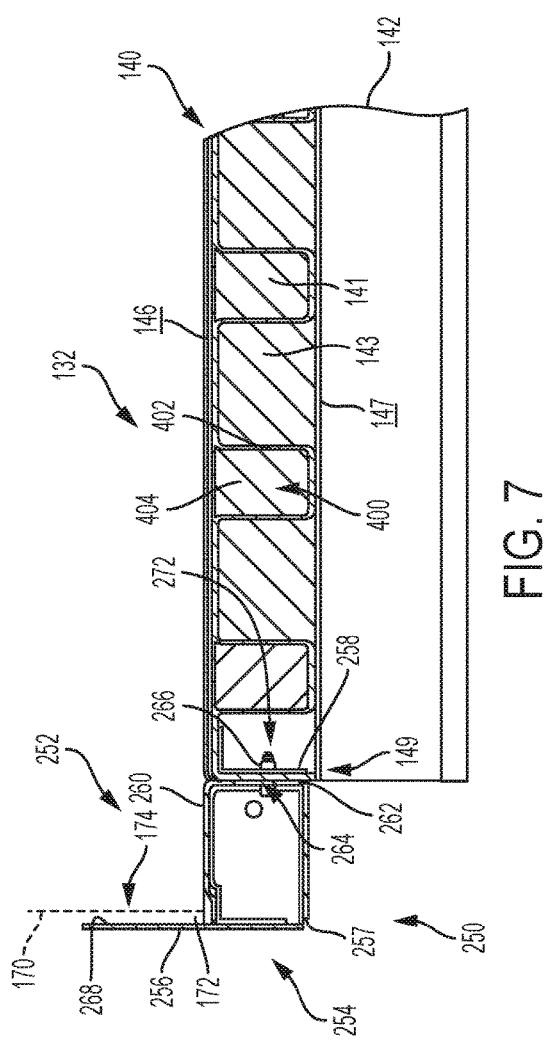

COMPOSITE FLOOR FOR A DRY TRUCK BODY

CROSS-REFERENCE TO RELATED APPLICATIONS

The present application claims priority to U.S. Provisional Patent Application Ser. No. 62/299,308, filed Feb. 24, 2016, and entitled "COMPOSITE FLOOR FOR A DRY TRUCK BODY," the complete disclosure of which is expressly incorporated by reference herein.

FIELD OF THE DISCLOSURE

The present disclosure relates generally to cargo vehicles and methods of making the same. More particularly, the present disclosure relates to vehicles having composite cargo bodies and methods of making the same.

BACKGROUND OF THE DISCLOSURE

Vehicles with cargo bodies are used in the transportation industry for transporting many different types of cargo. Certain cargo bodies may be refrigerated and insulated to transport temperature-sensitive cargo. Additionally, other cargo bodies may be used for the storage and transport of dry cargo. Various components of cargo bodies may be formed of composite materials and joined to other composite or non-composite components of the cargo bodies.

SUMMARY OF THE DISCLOSURE

A vehicle is disclosed having a composite cargo body.

According to an exemplary embodiment of the present disclosure, a cargo body for a vehicle comprises a floor, a roof, a right sidewall coupled to the floor and the roof, a left sidewall coupled to the floor and the roof, and a nose coupled to the floor, the roof, the right sidewall, and the left sidewall, wherein the floor is constructed of a first composite material, and wherein the roof, the right sidewall, the left sidewall, and the nose are constructed of a second composite material different from the first composite material.

According to another exemplary embodiment of the present disclosure, a cargo body for a vehicle comprises a composite floor, a composite roof, a composite right sidewall coupled to the floor and the roof, a composite left sidewall coupled to the floor and the roof, and a composite nose coupled to the floor, the roof, the right sidewall, and the left sidewall. The cargo body further comprises a sidewall connector having a horizontally-extending portion positioned intermediate a bottom surface of at least one of the right and left sidewalls and a top surface of the composite floor.

According to yet another exemplary embodiment of the present disclosure, a cargo body for a vehicle comprises a composite floor, a composite roof, a composite right sidewall coupled to the floor and the roof, a composite left sidewall coupled to the floor and the roof, and a composite nose coupled to the floor, the roof, the right sidewall, and the left sidewall. The cargo body further comprises a connector assembly mechanically coupled to the nose and mechanically coupled to the composite floor.

Additional features and advantages of the present invention will become apparent to those skilled in the art upon consideration of the following detailed description of the illustrative embodiments exemplifying the best mode of carrying out the invention as presently perceived.

BRIEF DESCRIPTION OF THE DRAWINGS

The foregoing aspects and many of the intended advantages of this invention will become more readily appreciated as the same becomes better understood by reference to the following detailed description when taken in conjunction with the accompanying drawings.

FIG. 3 is a cross-sectional view of the cargo vehicle of FIG. 2, taken along line 3-3 of FIG. 2;

FIG. 4A is a detailed cross-sectional view of the floor and left sidewall of the cargo body of FIG. 3;

FIG. 6 is a front elevational view of the floor and nose connector assembly of FIG. 5; and FIG. 7 is a cross-sectional view of the nose, nose connector assembly, and floor of FIG. 6, taken along line 7-7 of FIG. 6.

Figure 1:
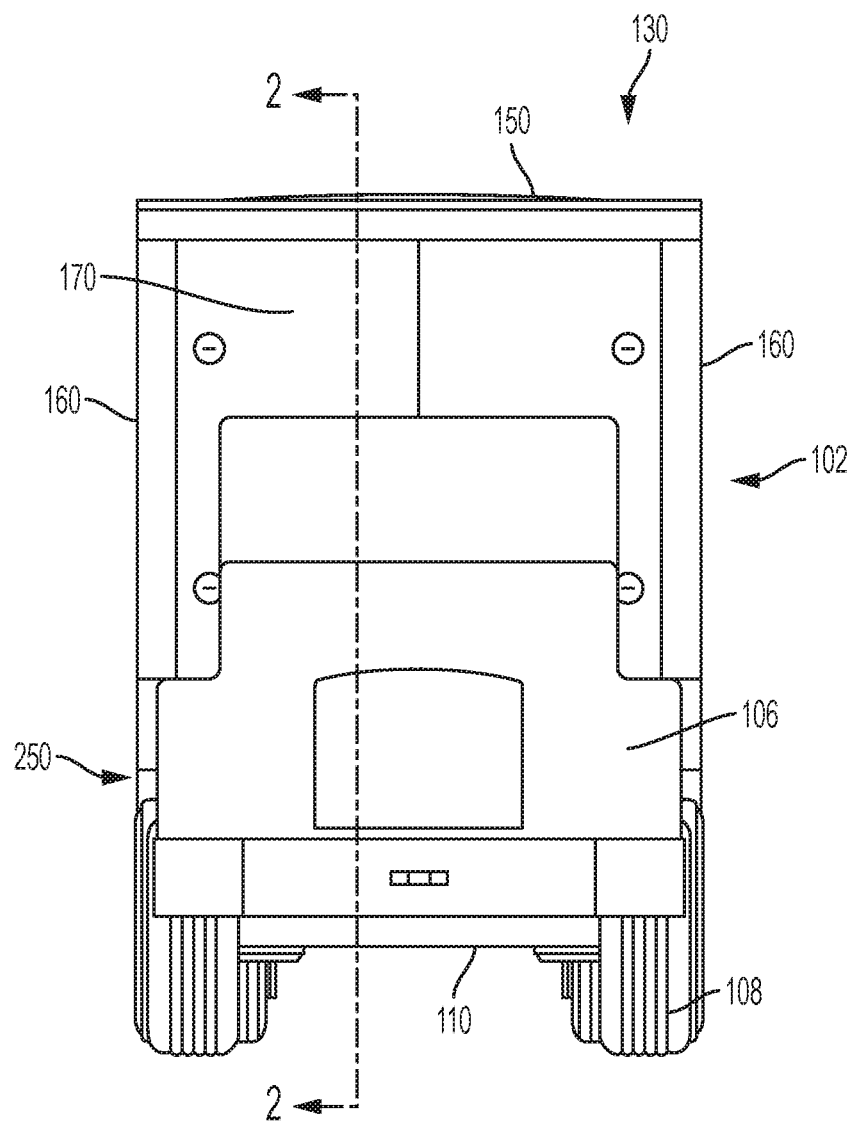
FIG. 1 is a front elevational view of a cargo vehicle including a motorized truck, a chassis, a plurality of wheels, and a cargo body, the cargo body including a floor, a roof, a right sidewall, a left sidewall, a nose, and a rear door assembly having a rear frame.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates an embodiment of the invention, and such an exemplification is not to be construed as limiting the scope of the invention in any manner.

DETAILED DESCRIPTION OF THE DRAWINGS

For the purposes of promoting an understanding of the principals of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrative devices and described methods and further applications of the principles of the invention which would normally occur to one skilled in the art to which the invention relates.

1. Cargo Vehicle

Figure 2:
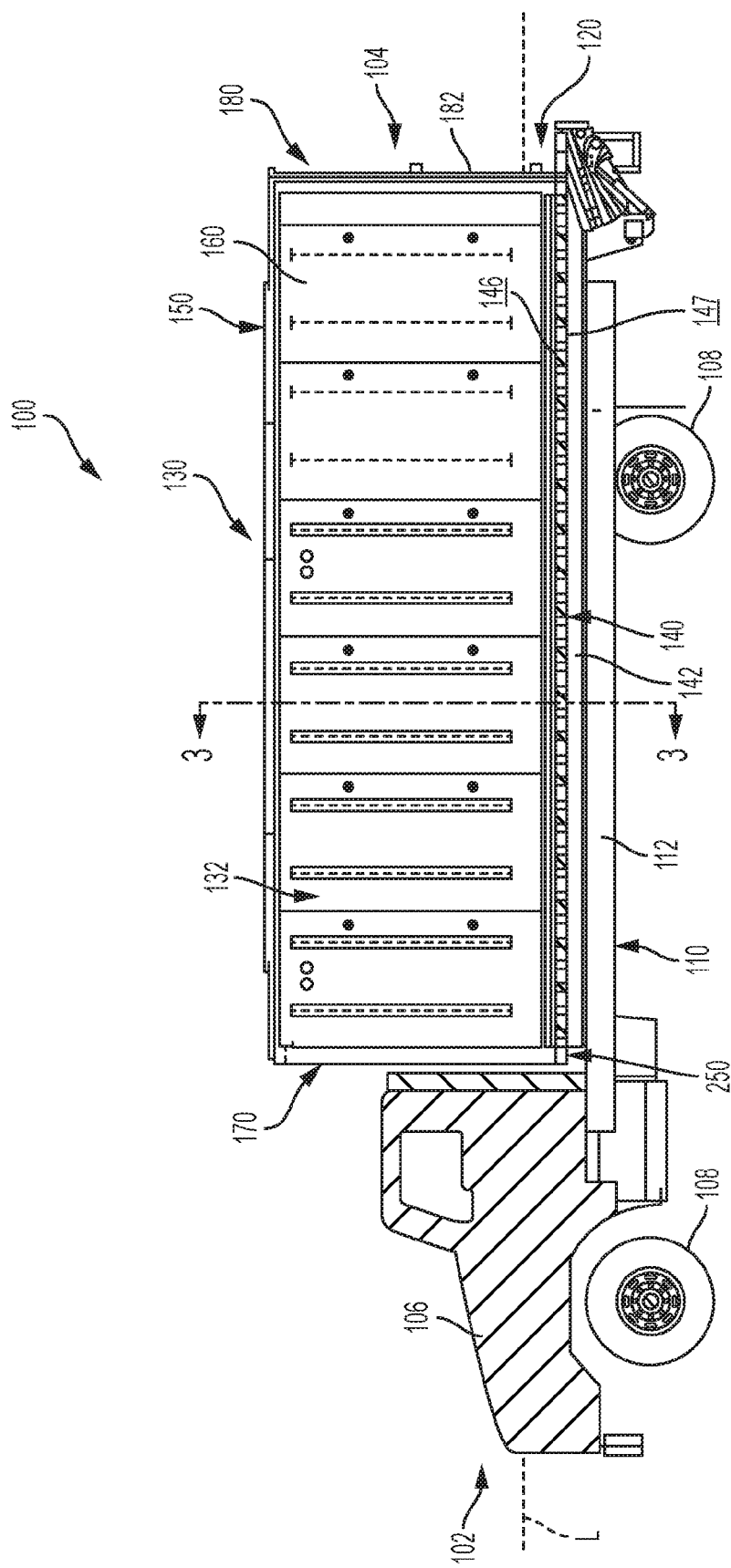
FIG. 2 is a cross-sectional view of the cargo vehicle of FIG. 1, taken along line 2-2 of FIG. 1.

Referring initially to FIGS. 1 and 2, a cargo vehicle 100 is shown for supporting and transporting cargo. Illustrative straight frame vehicle 100 extends along a longitudinal axis L from a front end 102 to a rear end 104 and includes a motorized truck 106 that powers a plurality of wheels 108 or other traction devices. Illustrative vehicle 100 also includes a chassis 110 having right and left longitudinal rails 112.

Illustrative vehicle 100 further includes a bumper assembly 120. Illustrative vehicle 100 still further includes a cargo body 130 including a floor 140, a roof 150, right and left sidewalls 160, a front wall or nose 170, and a rear door assembly 180 having a rear frame 182 and a door (not shown) to access the cargo body 130.

The illustrative floor 140 includes an upper surface 146 (i.e., platform) for supporting cargo and a lower surface 147 (i.e., underlayment) opposite the upper surface 146. Between upper surface 146 and lower surface 147, as shown in FIG. 7, floor 140 includes a plurality of transverse beams 141 and, optionally, a plurality of insert beams 143 positioned between adjacent transverse beams 141, both of which extend in a direction transverse to longitudinal axis L. The illustrative floor 140 also includes right and left longitudinal support beams 142 extending from lower surface 147 in a direction parallel to longitudinal axis L. More information regarding the construction of floor 140 may be found in U.S. Provisional Patent Application Ser. No. 62/299,215, filed Feb. 24, 2016, and titled "COMPOSITE FLOOR STRUCTURE AND METHOD OF MAKING THE SAME," the disclosure of which is expressly incorporated herein by reference in its entirety.

For the straight frame vehicle 100 shown in FIGS. 1 and 2, floor 140 is supported atop chassis 110. More specifically, support beams 142 of floor 140 are supported atop corresponding rails 112 of chassis 110. More information regarding the assembly of floor 140 to chassis 110 may be found in International Publication No. WO 2016/137974, filed Feb. 23, 2016, and titled "COMPOSITE REFRIGERATED TRUCK BODY AND METHOD OF MAKING THE SAME," the disclosure of which is expressly incorporated herein by reference in its entirety.

In the illustrated embodiment of FIGS. 1 and 2, cargo body 130 is an enclosed body and has an internal volume 132 configured to receive cargo. In one embodiment, cargo body 130 is configured to store and transport dry cargo. While the concepts of this disclosure are described in relation to a dry truck body, it will be understood that they are equally applicable to other vehicles generally, and more specifically to conventional trailers (e.g., refrigerated freight trailers, flatbed trailers, commercial trailers, small personal trailers) and/or box or van semi-trailers, and the like. Accordingly, those skilled in the art will appreciate that the present invention may be implemented in a number of different applications and embodiments and is not specifically limited in its application to the particular embodiments depicted herein.

2. Composite Materials

Referring still to FIGS. 1 and 2, cargo body 130 may be constructed, at least in part, of composite materials. For example, floor 140, roof 150, sidewalls 160, and/or nose 170 of the cargo body 130 may be constructed of composite materials. As such, cargo body 130 may be referred to herein as a composite structure. Cargo body 130 may be formed of single, unitary components from a plurality of layers permanently coupled together. Such composite materials are generally formed by combining two or more different constituents that remain separate and distinct in the final composite material.

Floor 140 may be constructed of a first composite material, such as a fiber-reinforced plastic (FRP) material, for example carbon-fiber-reinforced plastics (CRP). In one embodiment, and as shown in FIG. 7, floor 140 is formed from an extruded preform assembly 400 of a skin 402 including a woven or stitched fiberglass cloth and a nonwoven spun bond polymeric material, and a foam core 404. These preforms 400 may be cut to size, combined in a mold resembling the final shape with other fiberglass and resin layers, and wetted with at least one resin and a catalyst to define a single structure during a curing process. The spun bond polymeric material may be mechanically stitched to the fiberglass cloth and/or the foam before the preforms 400 are wetted with resin. In one embodiment, the spun bond material may be a polyester material, the foam may be a polyurethane material, and the resin may be a thermoset plastic resin matrix.

The individual preforms 400 used to form floor 140 may be sized, shaped, and arranged in a manner that accommodates the strength requirements of the final structure. In areas of the final structure requiring less strength, the preforms 400 may be relatively large in size, with the foam cores 404 spanning relatively large distances before reaching the surrounding fiberglass and polymeric skins 402. By contrast, in areas of the final structure requiring more strength, the preforms 400 may be relatively small in size, with the foam cores 404 spanning relatively small distances before reaching the surrounding fiberglass and polymeric skins 402. For example, the preforms 400 may be shaped as relatively wide panels in areas of the final structure requiring less strength and as relatively narrow beams (e.g., transverse beams 141 of FIG. 7) in areas of the final structure requiring more strength. Other exemplary techniques for strengthening such support beams include reinforcing the outer skins 402, such as by using uni-directional glass fibers or additional cloth in the outer skins 402, and/or reinforcing the inner cores 404, such as by using hard plastic blocks or higher density foam in the inner cores 404.

After the curing process for floor 140, a coating may be applied to the inner and/or outer surfaces of the cured preforms. Additionally, metallic or non-metallic sheets or panels may be applied to the inner and/or outer surfaces of the cured preforms, either in place of the coating or with the coating. The metallic sheets or panels may be comprised of stainless steel, aluminum, and/or coated carbon steel, and the non-metallic sheets or panels may be comprised of carbon fiber composites, for example.

In an exemplary embodiment, floor 140 may be comprised of PRISMA® structures provided by Compsys, Inc. of Melbourne, Fla. Such composite structures may be manufactured using technology disclosed in the following patents and published patent applications, each of which is incorporated by reference in its entirety herein: U.S. Pat. Nos. 5,429,066, 5,800,749, 5,664,518, 5,897,818, 6,013,213, 6,004,492, 5,908,591, 6,497,190, 6,911,252, 5,830,308, 6,755,998, 6,496,190, 6,911,252, 6,723,273, 6,869,561, 8,474,871, 6,206,669, and 6,543,469, and U.S. Patent Application Publication Nos. 2014/0262011 and 2014/0199551.

Other components of cargo body 130, such as roof 150, sidewalls 160, and/or nose 170 of FIGS. 1 and 2, may be formed of other composite materials different from the first composite material of floor 140. For example, roof 150, sidewalls 160, and/or nose 170 may lack fiber-reinforced plastics and/or internal foam cores and, instead, may be comprised of polymeric cores (e.g., high-density polyethylene) with metal (e.g., high-strength steel) or polymeric outer skins coupled to the polymeric cores to provide a rigid but lightweight and durable composite materials. In on embodiment, roof 150, sidewalls 160, and/or nose 170 are comprised of DuraPlate® structures provided by Wabash National Corporation of Lafayette, Indiana. Further, any portion of cargo body 130, including floor 140, roof 150, sidewalls 160, and/or nose 170 may be comprised of suitable non-composite materials, such as metals, metal alloys, and/or plastics, for example.

Alternatively, roof 150, sidewalls 160, and/or nose 170 (FIGS. 1 and 2) may be formed of composite materials comprised of a cellular polymeric and/or metallic material. For example, in one embodiment, the polymeric material may be comprised of a plastically deformable material, such as a thin thermoplastic material, a fiber composite material, a plastically deformable paper, or a metal sheet, which defines a cellular honeycomb structure. The cellular honeycomb structure may include open cells and/or closed cells and each cell may have a circular or polygonal cross-sectional shape. Additionally, the cellular honeycomb structure may be joined with covering layers on one or both sides thereof for generally enclosing at least a portion of the honeycomb structure. For example, the covering layers may be directly extruded or laminated onto the honeycomb structure and may be comprised of metal and/or polymeric materials. Such composite structures may be manufactured using technology disclosed in U.S. Pat. No. 6,726,974, issued on Apr. 27, 2004, and entitled "THERMOPLASTIC FOLDED HONEYCOMB STRUCTURE AND METHOD FOR THE PRODUCTION THEREOF" and U.S. Pat. No. 8,795,806, issued on Aug. 5, 2014, and entitled "HALF CLOSED THERMOPLASTIC HONEYCOMB, THEIR PRODUCTION PROCESS AND EQUIPMENT TO PRODUCE," both of which are expressly incorporated by reference in entirety herein.

The composite construction of cargo body 130 may present certain advantages. First, because the composite structure may lack internal metal components, cargo body 130 may have a reduced heat loss coefficient (Ua) and improved thermal efficiency. Also, cargo body 130 may operate to minimize outgassing of blowing agents, minimize air loss, and minimize water intrusion. Additionally, cargo body 130 may be lighter in weight than a typical metallic cargo body, which may improve fuel efficiency. Further, cargo body 130 may have fewer metallic structures than a typical cargo body, which may make cargo body 130 less susceptible to corrosion. Also, cargo body 130 may include fewer parts than a typical metallic cargo body, which may simplify construction, reduce inventory, and reduce variation in manufacturing. Further, cargo body 130 may be suitable for use with sensitive cargo, including foodstuffs, because the composite materials may be inert to avoid reacting with the cargo and other materials and because the composite materials may be easy to clean and maintain to ensure proper hygiene. As a result, cargo body 130 may qualify as "food grade" equipment.

3. Adhesive Bonding

Various connections or joints of cargo body 130 may be assembled, at least in part, using adhesive bonding. An adhesive 300 (FIG. 4) for bonding various components of cargo body 130 may be a structural adhesive that is suitable for load-bearing applications. Adhesive 300 may have a lap shear strength greater than 1 MPa, 10 MPa, or more, for example. Exemplary adhesives 300 include, for example, epoxies, acrylics, urethanes (single and two part), polyurethanes, methyl methacrylates (MMA), cyanoacrylates, anaerobics, phenolics, and/or vinyl acetates. Adhesive 300 may be selected based on the needs of the particular application.

The method used to form an adhesive bond may also vary according to the needs of the particular application. First, the surfaces receiving adhesive 300 (i.e., adherends) may be pre-treated, such as by abrading the surfaces, applying a primer, and/or cleaning the surfaces with a suitable cleaner (e.g., denatured alcohol). Second, adhesive 300 may be applied to the surfaces over a predetermined application time (i.e., "open" time) and at a predetermined application temperature. In certain embodiments, the application temperature may be below the glass-transition temperature of adhesive 300. Third, pressure may be applied to the surfaces, such as by using clamps, weights, vacuum bags, and/or ratchet straps, for example. Finally, adhesive 300 may be allowed to solidify. Some adhesives 300 may undergo a chemical reaction in order to solidify, referred to as curing. This curing may occur over a predetermined cure time and at a predetermined cure temperature. In certain embodiments, adhesive 300 may be heated during curing such that the cure temperature is higher than the application temperature.

Using adhesive bonding to assemble at least portions of composite cargo body 130 rather than mechanical fasteners may present certain advantages. First, the composite structure may not require holes for mechanical fasteners, so the structural integrity of the composite structure may be maintained. Also, the adhesive bond may be stronger than a connection using mechanical fasteners. In fact, the strength of the adhesive bond may exceed the strength of the composite structure itself, so the composite structure may delaminate or otherwise fail before adhesive 300 fails. Further, the elimination of mechanical fasteners may also provide improved aesthetics. Finally, adhesive 300 may form a seal between the adherends, which may help fill intentional or unintentional spaces between the adherends and insulate cargo body 130.

4. Connectors

Various connections of cargo body 130 may be assembled using one or more connectors, which may include brackets, braces, plates, and combinations thereof, for example. The connectors may vary in size and shape. For example, suitable connectors may be L-shaped, C-shaped, T-shaped, pi-shaped, flat, or bent.

The connectors may be constructed of metallic materials (e.g., aluminum, titanium, or steel), polymeric materials, wood, or composite materials. In certain embodiments, the connectors are constructed of materials which are dissimilar from the composite materials used to construct cargo body 130. The connectors may be fabricated by extrusion, pultrusion, sheet forming and welding, and/or casting, for example.

The connectors may be adhesively bonded to portions of cargo body 130. Additionally, the connectors may be mechanically fastened to non-composite (e.g., metallic) structures and composite structures of cargo body 130. For example, the connectors may be mechanically fastened to metallic rear frame 182 of cargo body 130. Suitable mechanical fasteners include bolts, rivets, and screws, for example.

5. Connection between Sidewalls and Composite Floor

Figure 4B:
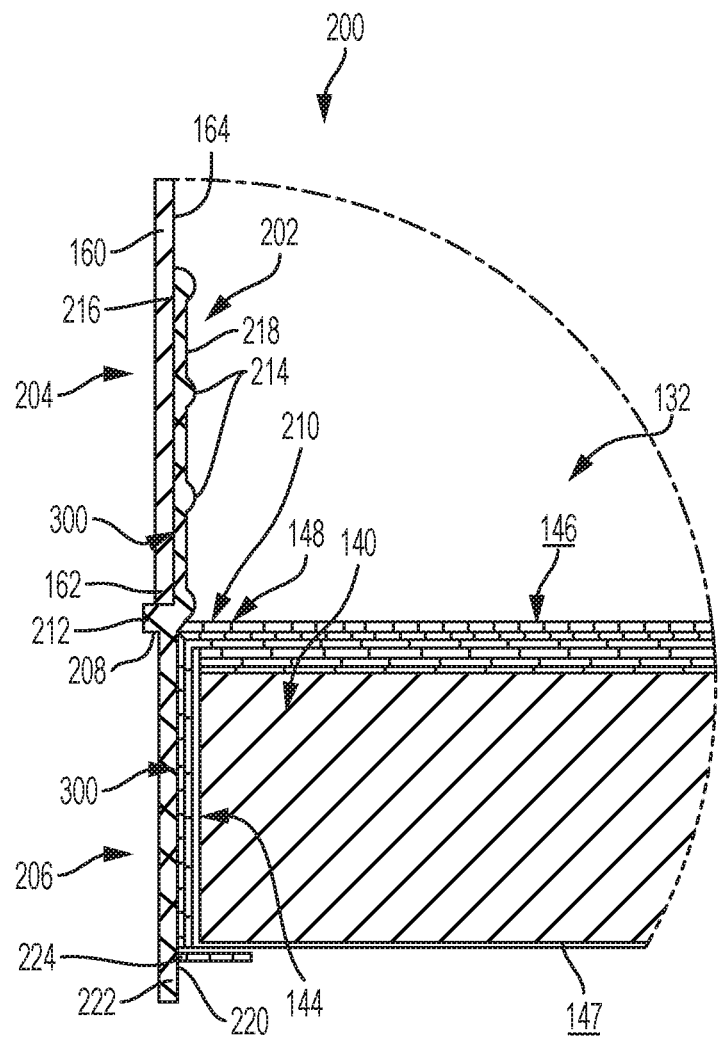
FIG. 4B is a detailed cross-sectional view of an alternative embodiment of the coupling between the floor and the left sidewall of the cargo body of FIG. 3.

Referring next to FIGS. 3, 4A, and 4B, a connection 200 is shown between composite sidewall 160 and composite floor 140. A lower end 162 of composite sidewall 160 may be laterally spaced apart from an outer edge 144 of composite floor 140 at connection 200. However, sidewall 160 is coupled to floor 140 and, more particularly, is bonded to floor 140 through a sidewall connector 202. Sidewall connector 202 includes an upper portion 204, a lower portion or base rail 206, and a horizontally-extending portion 208 vertically intermediate upper and lower portions 204, 206. Horizontally-extending portion 208 includes an inner flange 210 and an outer flange 212. In one embodiment, upper, lower, and horizontally-extending portions 204, 206, 208 are integrally formed together and comprised of a metallic material. Illustratively, upper portion 204 is laterally offset from lower portion 206, as disclosed herein, and flanges 210, 212 extend perpendicularly relative to upper and lower portions 204, 206.

As shown in FIG. 4A, an outer surface 216 of upper portion 204 of connector 202 is bonded to an inner surface 164 of sidewall 160 with adhesive 300. An opposing inner surface 218 of upper portion 204 of sidewall connector 202 includes at least one protrusion 214 which extends into internal volume 132 of cargo body 130. Protrusions 214 provide a gap or distance between connector 202 and any cargo within internal volume 132 of cargo body 130 to prevent cargo therein from damaging connector 200 or any component at connection 200. Additionally, lower end 162 of sidewall 160 rests atop outer flange 212 of sidewall connector 202 and also may be bonded thereto with adhesive 300. In this way, sidewall 160 is positioned laterally outside of upper portion 204 of connector 202.

Inner flange 210 of sidewall connector 202 extends in an opposite direction from outer flange 212 and, more particularly, extends inwardly into internal volume 132 of cargo body 130. Inner flange 210 rests atop an upper surface 146 of floor 140 and may be bonded thereto with adhesive 300. Illustratively, upper surface 146 of floor 140 may include a cut-out or recess 148 which receives inner flange 210 such that inner flange 210 and upper surface 146 of floor 140 cooperate to form a generally continuous, smooth, and level surface. In this way, any cargo positioned at connection 200 remains level on upper surface 146 of floor 140 and inner flange 210.

Alternatively, connection 200 between sidewall 160 and floor 140 may include mechanical fasteners, such as rivets or bolts, in addition to or in lieu of adhesive 300. Additionally, in a further embodiment, adhesive 300 may be a foam adhesive, such as foam tape.

Referring still to FIG. 4A, an inner surface 220 of lower portion 206 of connector 202 is bonded to outer edge 144 of floor 140 with adhesive 300. As such, lower portion 206 of connector 202 is laterally outward of floor 140. In one embodiment, a lower end 222 of lower portion 206 extends vertically below lower surface 147 of floor 140. Due to the lateral offset between upper portion 204 and lower portion 206 of connector 202, lower portion 206 is vertically aligned with at least a portion of sidewall 160 and upper portion 204 is vertically aligned with at least a portion of outer edge 144 of floor 140.

In an alternative embodiment, and as shown in FIG. 4B, lower end 222 of connector 202 may include a second horizontally-extending portion or base member 224 below lower surface 147 of floor 140, which extends generally perpendicularly to lower portion 206 and generally parallel to flanges 210, 212 of the first horizontally-extending portion 208. In one embodiment, base member 224 extends partially along a portion of lower surface 147 of floor 140, however, in a further embodiment, base member 224 extends along the complete width of lower surface 147 and is coupled to opposing sidewalls 160. Base member 224 may be integrally formed with connector 202 or may be coupled thereto with adhesive, welding, mechanical fasteners, or other coupling mechanisms. Base member 224 may be provided to further support the load of floor 140 when coupled to sidewalls 160 and/or facilitate alignment of floor 140 relative to sidewalls 160 during assembly.

To assemble floor 140 and sidewall 160 at connection 200, inner surface 220 of lower portion 206 of connector 202 may be bonded to outer edge 144 of floor 140 with adhesive 300. Additionally, either subsequent to or simultaneously with, adhesive 300 may be applied to recess 148 of upper surface 146 of floor 140. Then adhesive 300 may be applied to outer surface 216 of upper portion 204 of connector 202 and/or to the upper surface of outer flange 212. Inner surface 164 of sidewall 160 may then be positioned against outer surface 216 of upper portion 204 and lower end 162 of sidewall 160 may be positioned on outer flange 212 to bond connector 202 to sidewall 160. In this way, floor 140 is bonded to sidewall 160 through connector 202.

6. Connection between Composite Nose and Composite Floor

Figure 5:
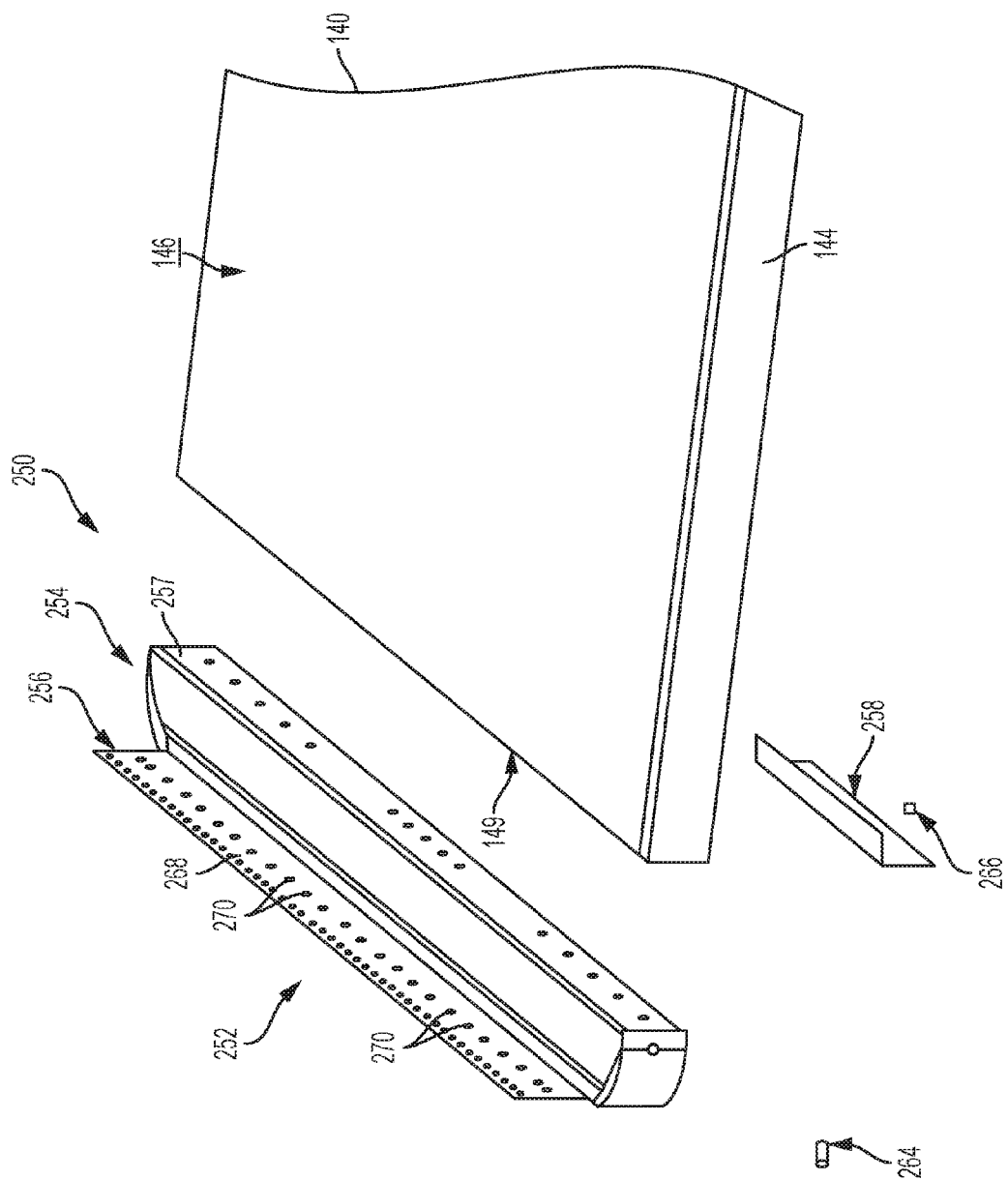
FIG. 5 is an exploded perspective view of the floor, a nose connector assembly, and a portion of the nose of the cargo body of FIG. 1.

Referring next to FIGS. 5-7, a connection 250 is shown between composite nose 170 and composite floor 140. In one embodiment, a nose connector assembly 252 may be included such that floor 140 is coupled to nose 170 through nose connector assembly 252. Nose connector assembly 252 is positioned forward of floor 140 and at least a portion of nose connector assembly 252 also is positioned forward of nose 170. Illustratively, nose connector assembly 252 includes a transversely-extending bracket 254 with a vertically-extending wall 256 and a frame member 257. Additionally, nose connector assembly 252 includes a rearward bracket 258 or, alternatively, bracket 258 may be a portion of floor 140. Illustratively, wall 256 defines the forward-most surface of nose connector assembly 252 and is positioned forward of nose 170. In one embodiment, wall 256 is integrally formed with frame member 257 or, alternatively, may be coupled or joined thereto with adhesive and/or mechanical fasteners, such as bolts, rivets, welds, or any other type of fasteners. Wall 256, frame member 257, and rearward bracket 258 each may be formed of a metallic material, a polymeric material, or any combination thereof.

An inner or rearward surface 268 of wall 256 may be adhesively bonded to at least a lower portion 174 and/or a lower end 172 of nose 170 with adhesive. As such, in one embodiment, nose 170 is bonded to nose connector assembly 252, thereby eliminating mechanical fasteners extending through at least lower portion 174 of nose 170. However, in the illustrated embodiment, wall 256 includes a plurality of holes 270 such that mechanical fasteners (not shown) may be inserted through wall 256 and nose 170, either alone or with adhesive, to couple nose 170 to nose connector assembly 252.

Frame member 257 of bracket 254 extends transversely to longitudinal axis L across at least a portion of a front edge 149 of floor 140. Frame member 257 is shown as a hollow member with a generally rectangular cross-section which may contribute to the decreased weight of cargo body 130. Alternatively, frame member 257 may be filled with a polymeric material (e.g., foam) or any other material to decrease vibration or noise at connection 250, increase the insulation of cargo body 130, or for any other purpose.

The forward surface of frame member 257 is defined by wall 256. Frame member 257 also includes an upper surface 260 which is generally flush with upper surface 146 of floor 140 to form a generally continuous and smooth or level surface between nose connector assembly 252 and floor 140. In this way, any cargo positioned at connection 250 remains level on upper surface 146 of floor 140 and upper surface 260 of frame member 257.

Additionally, frame member 257 includes a rearward surface 262 which is positioned adjacent front edge 149 of floor 140. In one embodiment, rearward surface 262 of frame member 257 is bonded to front edge 149 of floor 140 with adhesive. However, in the illustrative embodiment of FIGS. 5-7, rearward surface 262 of frame member 257 is mechanically coupled to front edge 149 of floor 140 through rearward bracket 258 and fasteners 264, 266. Rearward bracket 258 has an L-shape and is configured to be positioned in a recess 272 located beneath upper surface 146 of floor 140 and adjacent front edge 149 of floor 140 to reinforce front edge 149 of floor 140 when joined with nose connector assembly 252. Alternatively, rearward bracket 258 may have a C-shape, an O-shape, or be configured in any other shape and defined as a single or unitary component or include a plurality of components coupled together.

Rearward bracket 258 may be positioned within recess 272 of floor 140 at front edge 149 during the formation process of floor 140 or may be positioned at front edge 149 subsequent to forming floor 140, such as using adhesive. In a further embodiment, rearward bracket 258 may be positioned longitudinally intermediate front edge 149 of floor 140 and nose connector assembly 252 such that rearward bracket 258 is positioned outside and, more particularly, forward of floor 140. Mechanical fastener 264, illustratively a bolt, extends through rearward surface 262 of frame member 257, through front edge 149 of floor 140, and through a portion of rearward bracket 258 to couple with mechanical fastener 266, illustratively a nut, to mechanically couple floor 140 to nose connector assembly 252. In one embodiment, adhesive also may be used with fasteners 264, 266 to join floor 140 to nose connector assembly 252 or adhesive may be used in lieu of fasteners 264, 266 to join floor 140 to nose connector assembly 252.

To assemble floor 140 and nose 170 at connection 250, rearward bracket 258 is positioned inside recess 272 of floor 140 and adhered to front edge 149 of floor 140. Then rearward surface 262 of frame member 257 is coupled to floor 140 and bracket 258 with fasteners 264, 266. In particular, upper surface 260 of frame member 257 is aligned with upper surface 146 of floor 140 and rearward surface 262 of frame member 257 is aligned with front edge 149 of floor 140 before fasteners 264, 266 are coupled together. With front edge 149 of floor 140 sandwiched between surface 262 of frame member 257 and bracket 282, as shown in FIG. 7, frame member 257 and bracket 282 may serve as backing or reinforcing plates that support front edge 149 for receipt of fasteners 264, 266 by reducing potential stress concentrations around fasteners 264, 266 and their corresponding holes. With floor 140 coupled to nose connector assembly 252, nose 170 is then positioned against wall 256. In one embodiment, lower end 172 of nose 170 may be vertically spaced above upper surface 260 of frame member 257 by 0.1-2.0 inches. Alternatively, lower end 172 of lower portion 174 of nose 170 may contact upper surface 260 of frame member 257. In one embodiment, mechanical fasteners (not shown) are inserted through holes 270 in wall 256 and through nose 170 to mechanically fasten nose 170 to nose connector assembly 252. In another embodiment, adhesive is applied to inner surface 268 of wall 256 and lower portion 174 of nose 170 is pressed against adhesive to bond nose 170 to nose connector assembly 252. In this way, floor 140 is coupled to nose 170 through nose connector assembly 252 because wall 256 is coupled to nose 170 and frame member 257 and bracket 258 are coupled to floor 140.

It is within the scope of the present disclosure that any connection between any of the components of cargo body 130 may be made with adhesive, mechanical fasteners, or a combination thereof.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:

1. A cargo body for a vehicle having a longitudinal axis, a right chassis rail, and a left chassis rail, the cargo body comprising:
    a floor;
    a roof;
    a right sidewall coupled to the floor and the roof;
    a left sidewall coupled to the floor and the roof; and
    a nose coupled to the floor, the roof, the right sidewall, and the left sidewall; and
    wherein:
        the floor is constructed of a first composite material including:
            a plurality of transverse preform beams which extend perpendicular to the longitudinal axis;
            a right longitudinal preform beam positioned inward of the right sidewall and extending downward from the plurality of transverse preform beams in alignment with the right chassis rail such that the right longitudinal preform beam is supported atop the right chassis rail; and
            a left longitudinal preform beam positioned inward of the left sidewall and extending downward from the plurality of transverse preform beams in alignment with the left chassis rail such that the left longitudinal preform beam is supported atop the left chassis rail; and
        at least the right sidewall, the left sidewall, and the nose are constructed of a second composite material different from the first composite material.

2. The cargo body of claim 1, wherein the first composite material is a fiber-reinforced polymer.

3. The cargo body of claim 1, wherein:
    each transverse preform beam of the first composite material comprises a foam core; and
    the second composite material comprises a high-density polymer core.

4. The cargo body of claim 1, wherein:
    each transverse preform beam of the first composite material comprises a fiberglass and polymer skin; and
    the second composite material comprises a metal skin.

5. The cargo body of claim 1, further comprising:
    a sidewall connector having a horizontally-extending portion positioned intermediate a bottom surface of at least one of the right and left sidewalls and a top surface of the floor.

6. The cargo body of claim 5, wherein the horizontally-extending portion is adhesively bonded to the bottom surface of at least one of the right and left sidewalls and the top surface of the floor.

7. The cargo body of claim 5, wherein the sidewall connector includes an upper portion bonded to an inner surface of at least one of the right and left sidewalls and a lower portion bonded to an outer surface of the floor.

8. The cargo body of claim 7, wherein the upper portion of the sidewall connector is laterally offset from the lower portion of the sidewall connector.

9. The cargo body of claim 7, wherein the horizontally-extending portion of the sidewall connector extends between the upper portion of the sidewall connector and the lower portion of the sidewall connector.

10. The cargo body of claim 7, wherein the upper portion of the sidewall connector is integral with the lower portion and the horizontally-extending portion.

11. The cargo body of claim 7, wherein the lower portion of the sidewall connector extends below a bottom surface of the floor.

12. The cargo body of claim 7, wherein the lower portion of the sidewall connector is linearly aligned with one of the right and left sidewalls.

13. The cargo body of claim 5, wherein the sidewall connector includes at least one protrusion extending into an interior of the cargo body.

14. The cargo body of claim 5, wherein the sidewall connector includes a second horizontally-extending portion positioned beneath a bottom surface of the composite floor.

15. The cargo body of claim 1, further comprising:
a connector assembly mechanically coupled to the nose and mechanically coupled to the floor.

16. The cargo body of claim 15, wherein the nose is longitudinally spaced apart from a forward surface of the floor.

17. The cargo body of claim 15, wherein the connector assembly extends forward from a forward surface of the nose and a forward surface of the floor.

18. The cargo body of claim 15, wherein the connector assembly includes a hollow frame member extending transversely along a forward surface of the floor.

19. The cargo body of claim 18, wherein an upper surface of the floor is flush with an upper surface of the frame member of the connector assembly.

20. The cargo body of claim 18, wherein an upper surface of the frame member supports a bottom surface of the nose.

21. The cargo body of claim 1, wherein the floor is a single structure with the preform beams molded together by a cured resin.

* * * * *